US011423110B1

(12) United States Patent
Ene

(10) Patent No.: US 11,423,110 B1
(45) Date of Patent: Aug. 23, 2022

(54) INTELLIGENT TIMELINE AND COMMERCIALIZATION SYSTEM WITH SOCIAL NETWORKING FEATURES

(71) Applicant: Finvar Corporation, Houston, TX (US)

(72) Inventor: Ikenna N. Ene, Houston, TX (US)

(73) Assignee: Finvar Corporation, Houston, TX (US)

(*) Notice: Subject to any disclaimer, the term of this patent is extended or adjusted under 35 U.S.C. 154(b) by 0 days.

(21) Appl. No.: 17/481,688

(22) Filed: Sep. 22, 2021

(51) Int. Cl.
*G06F 16/00* (2019.01)
*G06F 16/954* (2019.01)
(Continued)

(52) U.S. Cl.
CPC ........ *G06F 16/954* (2019.01); *G06F 16/9537* (2019.01); *G06F 16/9558* (2019.01);
(Continued)

(58) Field of Classification Search
CPC ........ G06F 40/205; G06F 40/30; G06F 3/016; G06F 3/0488; G06F 3/04883; G06F 2203/04808; G06F 3/04186; G06F 9/445; G06F 9/453; G06F 3/0482; G06F 9/543; G06F 21/316; G06F 2203/0383; G06F 3/011; G06F 3/017; G06F 3/038; G06F 16/95; G06F 21/32; G06F 2203/013; G06F 2203/0382; G06F 2203/0384; G06F 3/0325; G06F 3/03543; G06F 3/0383; G06F 3/0487; G06F 3/16; G06F 16/951; G06F 1/1601; G06F 1/1626; G06F 1/163; G06F 1/1632; G06F 1/1643; G06F 1/1673; G06F 1/1684; G06F 1/169; G06F 1/3231;
(Continued)

(56) References Cited

U.S. PATENT DOCUMENTS 7,149,716 B2   12/2006   Gatto
7,353,265 B2   4/2008    Gopalkrishnan et al.
(Continued)

FOREIGN PATENT DOCUMENTS

AU    2018247209 A1   11/2018
WO    2019119626 A1   6/2019

*Primary Examiner* — Yicun Wu
(74) *Attorney, Agent, or Firm* — Wooshik Shim; Bold IP, PLLC

(57) ABSTRACT

A computer implemented system for an intelligent timeline includes computer readable instructions to operate a timeline engine, a calendar engine, a performance evaluation engine, and a social networking engine that are interconnected to one another. The system may additionally include an advertisement placement engine. The timeline engine creates a timeline of events containing external events and/or an owner's actions. Each event has a timestamp such that the events may be arranged in the order of timestamps. In some embodiments, events may be automatically created if certain conditions are met. The calendar engine creates a calendar containing the events and other reminders. The performance evaluation engine creates performance evaluation results of an owner's actions based on the events. The timeline of an owner may be sold or shared on the owner's social networking channel to subscribers. Advertisement placement engine facilitates advertisement transactions related to the timelines.

20 Claims, 5 Drawing Sheets

(51) Int. Cl.
*G06F 16/955* (2019.01)
*G06F 16/9537* (2019.01)
*G06Q 50/00* (2012.01)
*G06Q 30/06* (2012.01)
*G06Q 30/02* (2012.01)

(52) U.S. Cl.
CPC ..... *G06Q 30/0201* (2013.01); *G06Q 30/0277* (2013.01); *G06Q 30/0601* (2013.01); *G06Q 50/01* (2013.01)

(58) Field of Classification Search
CPC ..... G06F 2200/1637; G06F 2203/0336; G06F 3/012; G06F 3/015; G06F 3/021; G06F 3/0346; G06F 3/0395; G06F 3/048; G06F 8/65; G06F 9/452; G06F 9/54; G06F 21/45; G06F 21/6245; G06F 2209/503; G06F 2209/509; G06F 3/023; G06F 9/5027; G06F 9/5055; G06F 9/52; G06Q 50/01; G06Q 10/04; G06Q 10/06; G06Q 10/063; G06Q 10/0833; G06Q 30/0201; G06Q 30/0202; G06Q 30/0207; G06Q 30/0282; G06Q 50/26; G06Q 10/101; G06Q 20/12; G06Q 20/40; G06Q 30/0241; G06Q 10/0637; G06Q 10/10; G06Q 10/103; G06Q 10/1095; G06Q 20/047; G06Q 20/10; G06Q 20/20; G06Q 20/204; G06Q 20/306; G06Q 20/308; G06Q 20/321; G06Q 20/384; G06Q 20/386; G06Q 20/407; G06Q 30/02; G06Q 30/06; G06Q 30/0601; G06Q 30/0605; G06Q 30/0631; G06Q 30/0643; G06Q 40/12; G06Q 30/0625; G06Q 30/0633; G06Q 30/0635; G06Q 30/0641; G06Q 50/205
See application file for complete search history.

(56) References Cited

U.S. PATENT DOCUMENTS

| | | | |
|---|---|---|---|
| 7,644,011 B2 | 1/2010 | Shkedy | |
| 7,653,582 B2 | 1/2010 | Costache et al. | |
| 8,458,084 B2 | 6/2013 | Yakubov | |
| 9,536,258 B2 | 1/2017 | Traina et al. | |
| 9,552,334 B1* | 1/2017 | Meisels | G06F 40/295 |
| 9,823,818 B1 | 11/2017 | Ryan et al. | |
| 10,497,064 B2 | 12/2019 | Wagner | |
| 10,740,772 B2 | 8/2020 | Wagner et al. | |
| 10,853,585 B2 | 12/2020 | Ninan et al. | |
| 2004/0249687 A1 | 12/2004 | Lowell et al. | |
| 2010/0030578 A1* | 2/2010 | Siddique | H04W 4/00 |
| | | | 705/26.1 |
| 2013/0138577 A1 | 5/2013 | Sisk | |
| 2013/0185223 A1 | 7/2013 | Duzoglou | |
| 2013/0198108 A1 | 8/2013 | Walia et al. | |
| 2014/0122483 A1* | 5/2014 | Zhang | G06Q 50/01 |
| | | | 707/758 |
| 2015/0213512 A1* | 7/2015 | Spievak | G06Q 30/0275 |
| | | | 705/14.71 |
| 2016/0210602 A1* | 7/2016 | Siddique | G06Q 20/384 |
| 2018/0032997 A1* | 2/2018 | Gordon | G06Q 30/0269 |
| 2018/0342014 A1 | 11/2018 | Peretz | |
| 2019/0102460 A1 | 4/2019 | Tabak et al. | |
| 2020/0019292 A1 | 1/2020 | Monte | |
| 2020/0410599 A1 | 12/2020 | Freisthler | |
| 2021/0174427 A1* | 6/2021 | Isaacson | G07F 9/001 |

\* cited by examiner

FIG. 4

INTELLIGENT TIMELINE AND COMMERCIALIZATION SYSTEM WITH SOCIAL NETWORKING FEATURES

TECHNICAL FIELD

The present description includes embodiments generally directed to an intelligent timeline and commercialization system with social networking features.

BACKGROUND

Personal schedulers using calendars have been around for many years to assist busy people with organizing their personal and business-related events. With the advent of the Internet followed by the widespread adoption of mobile communication, many desktop solutions and mobile apps have been developed that enable convenient schedule organization using calendars. Some of those solutions integrate in one platform various functions, such as marking appointments, sharing appointments with other participants, inviting others to the appointments, adding other information such as appointment venues represented by their GPS coordinates, attaching relevant files, adding links, and so on.

Timelines are a useful tool in the financial sector as well. Short-term and long-term investment returns are heavily driven by news about a particular company, industry, policies, politics, natural disasters, accidents, technological breakthroughs, and so forth. Keeping track of various news related to a specific investment target therefore is key to promptly responding to and thereby taking advantage of opportunities. In order to improve his/her performance, it may be crucial for a fund manager to have a series of news and data streaming through a single channel customized according to his/her interest and relevance to a specific investment target.

An example of a timeline would be an oil industry timeline. Oil prices are very sensitive to many factors including energy policies, political (in)stability of major oil producing countries, resolutions of the OPEC member nations, seasonal weather, and the world economy. A timeline for an oil industry may be able to capture various events or news related to the oil industry and arrange them according to the times of those events.

Sometimes events on a timeline are linked to a calendar. In this case, important future events may be displayed on an individual's calendar. Alerts and notifications may be set on a calendar. Appointments or meetings may be scheduled to discuss the events. Attachments and links may be added to event schedules.

Performance evaluation and review is a very important task for human resources (HR) departments in many companies. Performance in the financial sector can often be evaluated by the profits gained through a series of transactions as well as the timeliness and quality of actions taken by stakeholders in response to external events. For example, fund managers strive to obtain streams of incoming news and data to analyze whether and how much a specific piece of news affects a certain price or instrument in order to maximize returns by determining optimum buying and selling timings. More generally speaking, not only in the financial sector but in many other sectors, performance evaluations measure over certain time periods the accuracy and timeliness of a person's analysis and/or prediction of a certain quantity, risk, or value (for example, stock price) between an initial action (buying) and a final action (selling).

However, the decision making and performance of a fund manager are only visible to a limited number of people, mostly to in-house HR personnel, and the regular performance evaluation over time based on specific decisions is not widely disclosed to the public. This is partly because the decision-making process itself of a professional fund manager is a valuable proprietary asset. As a result, clients who choose their funds have limited information about the kind of actions taken by managers of the funds. Worse yet, sometimes an advisor's words and published research including market forecasts may often be in contradiction to the same person's actual buying and selling actions. In other words, retail clients of funds have very limited resources to evaluate the actual transactions and capability of fund managers. Therefore, there is a need for giving commercial benefits to fund managers in order to encourage them to disclose their actions to retail clients.

As people capture more photographs and information using their smartphones and share them on social networking services (SNS), timelines are increasingly found on more applications as channels for information distribution. Many sub-services became popular which automatically sort pictures, data and other files according to their similarity and/or timestamps. For example, large retail Internet companies offer timelines of photographs stored in their cloud storage that remind users of cherished memories that took place weeks, months, or years ago. Similar services are also provided by SNS companies, whereby users are reminded to look back on their postings they made in the past. However, these timelines have not been made commercially available in a way that access to the timelines becomes a separate asset which are sold to the subscribers to an SNS channel.

As described above, timelines of events may be linked up with calendars, and timelines of personal events may be arranged and displayed on SNS or other Internet companies. However, personal schedulers and electronic calendars have not been assets that directly generate income for their owners or accumulate large third-party followings. More specifically, transforming timelines into portable income-generating assets and making them available on a system integrating timelines of events and market data, calendars, and performance evaluations with social networking features and e-commerce have not been existent. Therefore, there is a need for such an intelligent timeline transaction system.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

There currently exists a need for a system that transforms timelines into portable assets, integrates the timelines with performance evaluations, intelligence and commercial value, and makes timelines available on various platforms such as calendar and social networking channels. The present description includes embodiments generally directed to an intelligent timeline and commercialization system with social networking features.

In one or more embodiments, an intelligent timeline system includes a timeline engine, a calendar engine, a performance evaluation engine, and a social networking engine that are interconnected to one another. The system may additionally include an advertisement placement engine. The timeline engine creates a timeline of events containing external events, datasets and/or an owner's actions. Each event has a timestamp such that the events may be arranged in the order of timestamps. In some embodiments, events may be automatically created if certain conditions are met. The calendar engine creates a calendar containing the events and other reminders. The performance evaluation engine creates performance evaluation results of an owner's actions based on the events. The timeline of an owner may be sold or shared on the owner's social networking channel to subscribers. The advertisement placement engine facilitates advertisement transactions related to the timelines.

Other aspects and advantages of the invention will be apparent from the following description, drawings, and appended claims.

BRIEF DESCRIPTION OF DRAWINGS

The present invention will be described by way of exemplary embodiments, but not limitations, illustrated in the accompanying drawings in which like references denote similar elements, and in which:

FIG. 4 is an exemplary calendar display.

DETAILED DESCRIPTION

Figure 1:
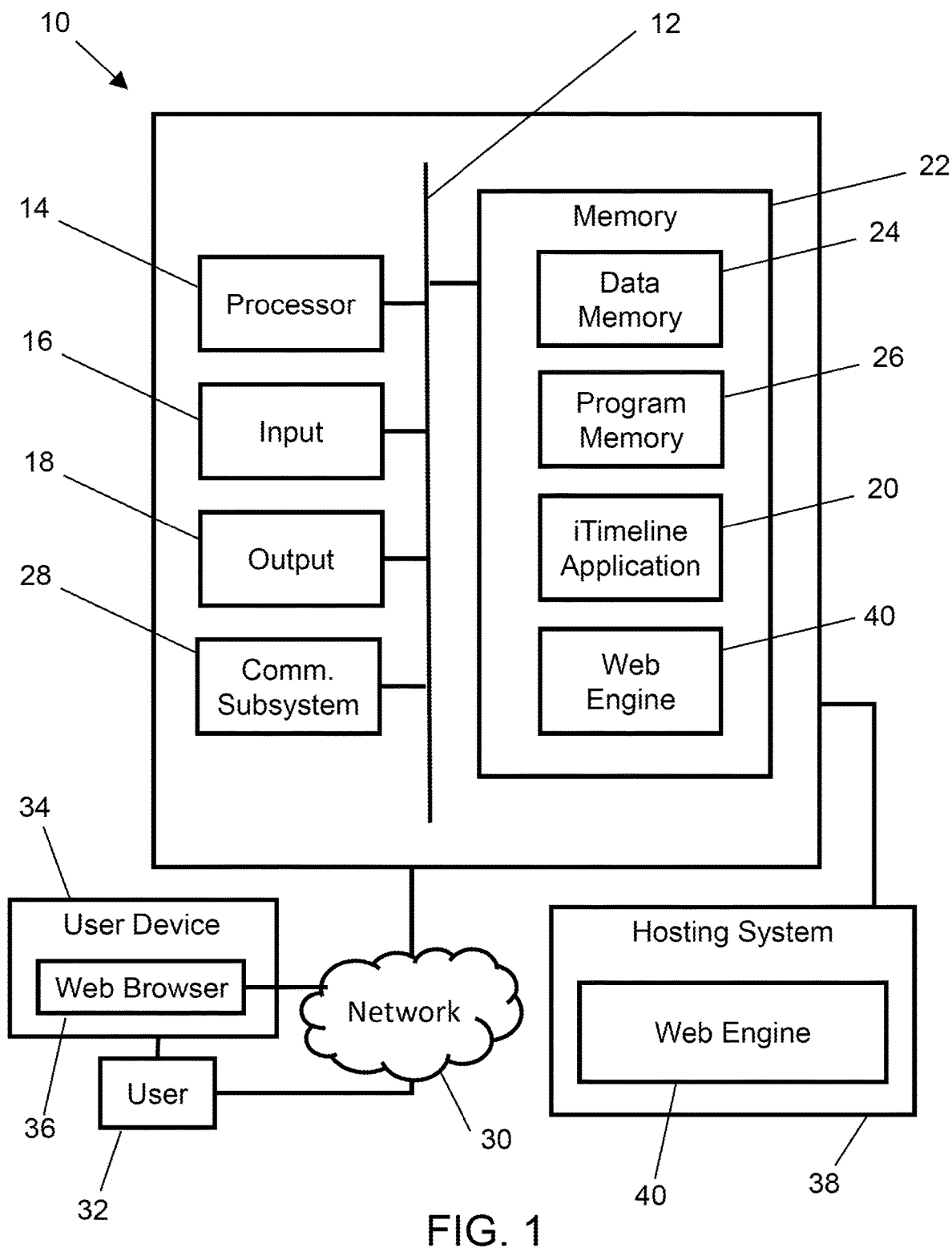
FIG. 1 is a block diagram of a computer implemented system.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25, upper limit is 100, and includes both 25 and 100.

As a preface to the detailed description, it should be noted that, as used in this specification, the singular forms "a," "an," and "the" include plural referents, unless the context clearly dictates otherwise. Like reference numbers and designations in the various drawings indicate like elements.

The present description includes one or more embodiments for a computer implemented system for an intelligent timeline and commercialization thereof with social networking features. The computer implemented system may be used for providing timelines, calendars, market data, performance evaluation results, and social networking channels to which subscribers may obtain access on their computer screens or mobile devices. More specifically, the computer implemented system may include a memory comprising a program memory and a database, wherein the program memory includes processor readable instructions stored therein, and a processor configured to read and execute the processor readable instructions including a timeline engine, a calendar engine, a performance evaluation engine, and a social networking engine. These processor readable instructions may alternatively be stored in a hosting system or any other server providing webpages to subscribers.

The processor readable instructions may be executed to: receive events containing timestamps and searchable tags; store the events in a database; provide timelines where the timelines select timeline events from the events by searching the searchable tags; provide for each of the timelines a performance evaluation result based on at least two events; provide a social networking channel with timelines and their performance evaluation results where subscription accounts with proper subscription levels have access to the timelines and the performance evaluations; and generate images for displaying the timelines, performance evaluation results, and/or social networking channels. The timelines, calendars, performance evaluation results, and social networking channels are interconnected to one another such that subscribers may access them using hyperlinks.

The timeline engine creates a timeline of events containing external events and/or an owner's actions. Each of the events has a timestamp. The timeline events are linkable to the calendar. The calendar engine creates a calendar containing reminders such as events, data points, tasks, and appointments, where a reminder linked to a timeline event may be created. The performance evaluation engine creates performance evaluation results of an owner's actions. The performance evaluation results may comprise an initial action and a final action or event, where the predictive power of the initial action may be evaluated against the final action or event. The timeline of an owner may be shared on the owner's social networking channel such that the timeline events may be viewable to subscribers. In one or more embodiments, the performance evaluation results of the owner may also be shared to subscribers on the owner's social networking channel. In one or more embodiments, the social networking channel may facilitate placement of advertisements. The advertisements may be customized to personally target individuals according to the individuals' interests and uses.

One or more embodiments of the present description also include a performance evaluation engine whereby the owner's actions of the timeline are evaluated in real time and/or in retrospect with or without respect to the external events. One or more embodiments of the present description also include a subscription system whereby one or more subscribers may subscribe and gain access to the performance evaluation of an owner's actions in real time and/or in retrospect. The performance evaluation engine is embedded in the owner's social network channel such that the performance evaluation of an owner's actions is shared to the owner's subscribers. In one or more embodiments, an owner's timeline may also be shared with the subscribers. The subscribers may additionally be allowed to comment on the performance and share other information on the owner's channel.

It must be emphasized that, although the present description takes many specific examples from the financial sector, the present description is not limited to the financial sector but rather applicable to many different industries including but not limited to the sports betting industry, where competitive performance evaluation based on the predictive power is highly desirable and where sharing well-informed, high-performing actions with subscribers may be highly valued.

Referring to FIG. 1, an exemplary computer implemented system that may be employed in practicing one or more non-limiting embodiments of the invention is illustrated. Computer implemented system 10 may be any type of computing system known or to be created in the future. This may include, without limitation, computers fixed in place, such as desktop computers or mobile computing devices. Mobile computing devices may include, but are not limited to, laptop computers, smartphones and mobile phones, tablets, wearable electronic computing devices such as watches or glasses, or any other type of mobile electronic, computing device. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

Computer implemented system 10 may be any type of information handling system, including, but not limited to, any type of computing device as noted above. To reiterate, this may include small handheld devices, such as handheld computer/mobile telephones, personal digital assistants (PDAs), or may include large mainframe systems, such as a mainframe computer. Other examples of a computer implemented system 10 may include, but are not limited to, laptops, notebooks, workstation computers, cloud servers, personal computer systems, as well as servers. Computer implemented systems 10 can be used by various parties described herein and may be connected on a computer network, such as computer network 30. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect the information handling systems.

The computer implemented system 10 is shown comprising hardware elements that can be electrically coupled via a bus 12 (or may otherwise be in communication, as appropriate). The hardware elements of computer implemented system 10 may include one or more processors 14, including without limitation one or more general-purpose processors and/or one or more special-purpose processors (such as digital signal processing chips, graphics acceleration processors, and/or the like). Computer implemented system 10 may further include one or more input devices 16, which can include without limitation a mouse, a keyboard, and/or the like, which may be utilized in the implementation of intelligent timeline application 20.

In addition to the above, computer implemented system 10 may include one or more output devices 18 such as a device display. Furthermore, in some embodiments, an input device 16 and an output device 18 of computer implemented system 10 may be integrated, for example, in a touch screen or capacitive display as commonly found on mobile computing devices as well as desktop computers and laptops.

Processors 14 may have access to a memory such as memory 22. Memory 22 may include one or more of various hardware devices for volatile and non-volatile storage and may include both read-only and writable memory. For example, memory 22 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 22 is not a propagating signal divorced from underlying hardware; a memory is thus non-transitory. Memory 22 may include program memory such as program memory 26 capable of storing programs and software, such as an operating system (not shown), intelligent timeline application 20, and other computerized programs or application programs. Memory 22 may also include data memory such as data memory 24 that may include database query results, configuration data, settings, user options or preferences, etc., which may be provided to program memory 26 or any element of computer implemented system 10.

The computer implemented system 10 may further include (and/or be in communication with) one or more non-transitory storage devices, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices may be non-volatile data storage devices in one or more non-limiting embodiments. Alternatively, the storage devices may be non-volatile data storage accessible through computer network 30 in the form of a cloud storage. Further, computer implemented system 10 may be able to access removable nonvolatile storage devices that can be shared among two or more information handling systems (e.g., computer implemented system) using various techniques, such as connecting the removable nonvolatile storage device to a USB port or other connector of the information handling systems.

The computer implemented system 10 might also include a communications subsystem 28, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 28 may permit data to be exchanged with a network (e.g., such as network 30), other computer systems, and/or any other devices.

The computer implemented system 10 also can comprise software elements, shown as being currently located within the memory 22, which in some instances may include an operating system (not shown), device drivers, executable libraries, and/or other code, which may comprise computer programs provided by various embodiments, and/or may be designed to implement methods, and/or configure systems, provided by other embodiments, as described herein. Merely by way of example, one or more procedures described above might be implemented as code and/or instructions executable by a computer (and/or a processor within a computer). In an aspect, then, such code and/or instructions can be used to configure and/or adapt computer implemented system 10 to perform one or more operations in accordance with the described procedures.

A set of these instructions and/or code might be stored on a computer-readable storage medium, such as the storage device(s) described above. In some cases, the storage medium might be incorporated within a computer system, such as computer implemented system 10. In other embodiments, the storage medium might be separate from computer implemented system 10 (e.g., a removable medium, such as a compact disc or USB stick), and/or be provided in an installation package, such that the storage medium can be used to program, configure, and/or adapt a general-purpose computer with the instructions/code stored thereon. These instructions might take the form of executable code, which is executable by the computer implemented system 10 and/or might take the form of source and/or installable code, which, upon compilation and/or installation on the computer implemented system 10 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer implemented system 10) to execute instructions in accordance with the disclosure. For example, some or all of the operations of the described invention may be performed by the computer implemented system 10 in response to one or more processors 14 executing one or more instructions (which might be incorporated into the operating system (not shown) and/or other code contained in the memory 22). Such instructions may be read into the memory 22 from another computer-readable medium, such as one or more of the storage device(s). Merely by way of example, execution of instructions contained in the memory 22 may cause the one or more processors 14 to perform one or more instructions described herein.

The terms "machine-readable medium" and "computer-readable medium," as used herein, refer to any medium that participates in providing data that causes a machine to operate in a specific fashion. In an embodiment using the computer implemented system 10, various computer-readable media might be involved in providing instructions/code to the one or more processors 14 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks which may be an example of storage devices. Volatile media may include, without limitation, dynamic memory, which may be a type of memory included in memory 22. Transmission media may include, without limitation, coaxial cables, copper wire and fiber optics, including the wires that comprise the bus 12, as well as the various components of the communications subsystem 28 (and/or the media by which the communications subsystem 28 provides communication with other devices). Transmission media can also take the form of waves (including without limitation radio, acoustic, and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 14 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer implemented system 10. These signals, which might be in the form of electromagnetic signals, acoustic signals, optical signals, and/or the like, are all examples of carrier waves on which instructions can be encoded, in accordance with various embodiments of the invention.

The communications subsystem 28 (and/or components thereof) generally will receive the signals, and the bus 12 then might carry the signals (and/or the data, instructions, etc. carried by the signals) to the memory 22, from which the one or more processors 14 retrieves and executes the instructions. The instructions received by the memory 22 may optionally be stored on a non-transitory storage device either before or after execution by the processor(s) 14.

In one or more embodiments, computer implemented system 10 is in communication with one or more networks, such as network 30. Network 30 may include a local area network (LAN), such as a company Intranet, a metropolitan area network (MAN), or a wide area network (WAN), such as the Internet or World Wide Web. Network 30 may be a private network, a public network, or a combination thereof. Network 30 may be any type of network known in the art, including a telecommunications network, a wireless network (including Wi-Fi), and a wireline network. Network 30 may include mobile telephone networks utilizing any protocol or protocols used to communicate among mobile digital computing devices, such as GSM, GPRS, UMTS, AMPS, TDMA, or CDMA. In one or more non-limiting embodiments, different types of data may be transmitted via network 30 via different protocols.

Network 30 may further include a system of terminals, gateways, and routers. Network 30 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, intelligent timeline application 20 may be implemented as a web service. As known in the art, a web service may be a software module or software program (e.g., intelligent timeline application 20) that is designed to implement a set of tasks that is accessible from multiple computing devices by multiple users such as a user 32, a user device 34 over a network 30. In particular, intelligent timeline application 20 may be implemented as a web service accessible using the World Wide Web as the connecting network 30, although any alternative type of network may be used. Intelligent timeline application 20, when implemented as a web service, can be searched by any user (e.g., user 32) using web browser 36. Intelligent timeline application 20 when implemented as a web service can be searched for over the network 30 using the input devices attached to the user device 34. Further, intelligent timeline application 20 when invoked as a web service would be able to provide functionality to the client or user who invoked that web service.

In one or more non-limiting embodiments, a computer implemented system, such as computer implemented system 10 may include a web engine such as web engine 40. Web engine 40 may generate images or web pages for any type of web browsers known in the art that a user 32 may use to access one or more web applications (e.g., intelligent timeline application 20) through the user device 34 via network 30. Web engine 40 may be separately stored from other applications such as intelligent timeline application 20, or intelligent timeline application 20 may include web engine 40. Web browser 36 may include a variety of hardware, software, and/or firmware generally operative to present a web application to a user 32 via a user device 34 (e.g., touchscreen or other type of monitor or display device). Examples of suitable web browsers include, but are not limited to, GOOGLE CHROME, MICROSOFT EDGE, MOZILLA FIREFOX, and APPLE SAFARI. Web browser may be previously installed by the manufacturer or company associated with the user device 34, or alternatively, may be downloaded onto user device 34 or any other computing device of the user 32.

When intelligent timeline application 20 is implemented as a web service, a user or subscriber may invoke a series of web service calls via requests to one or more web engines 40 that are part of the hosting system 38 which would host the actual web service. In one or more non-limiting embodiments, hosting system 38 may be a cloud-based type hosting system. "Cloud-based" is a term that refers to applications, services, or resources made available to users on demand via a network, such as network 30, from a cloud computing provider's server.

Figure 2:
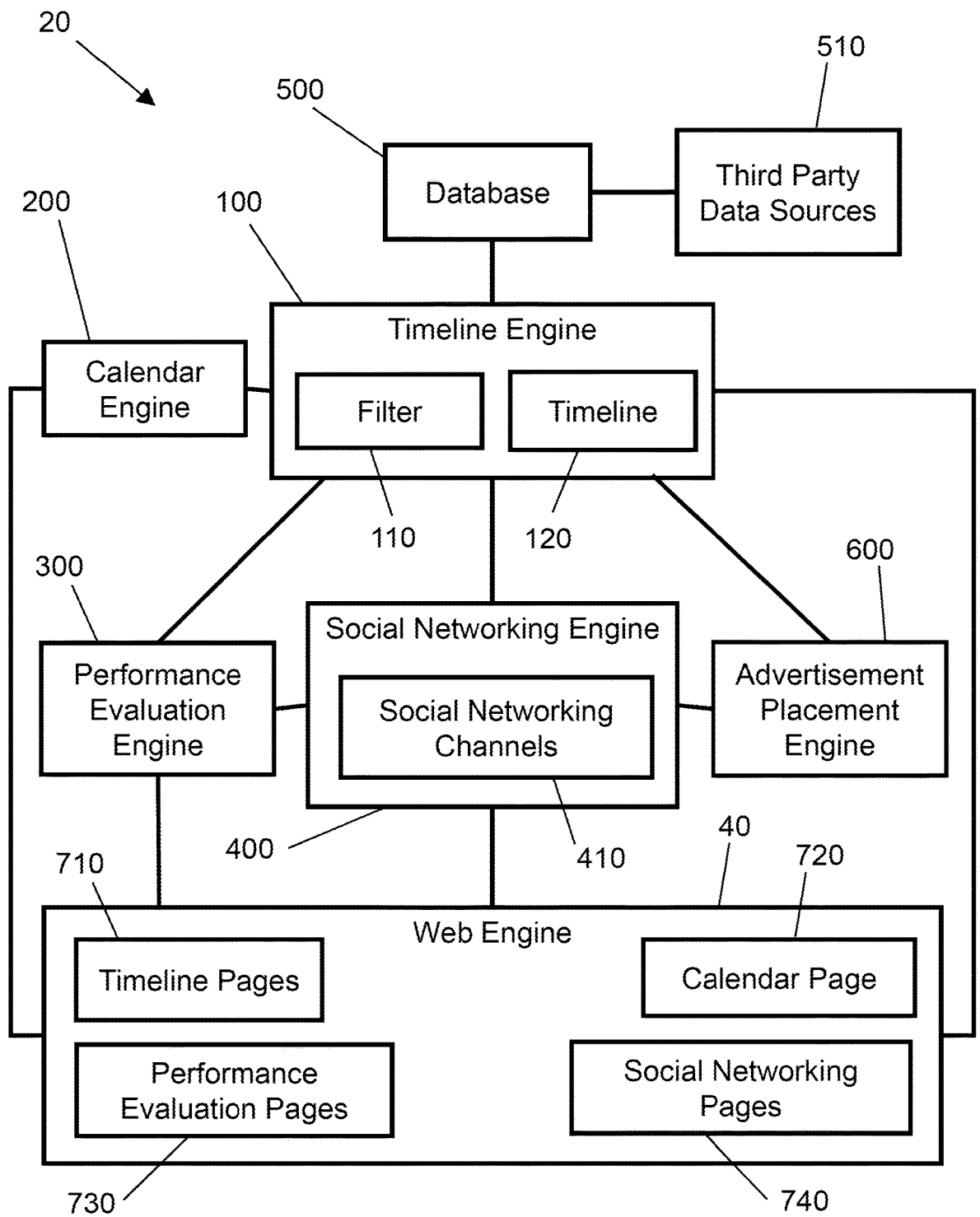
FIG. 2 is a block diagram of the intelligent timeline application of the present invention.

Referring to FIG. 2, a block diagram of an exemplary intelligent timeline application 20 is shown. The intelligent timeline application 20 includes a timeline engine 100, a calendar engine 200, a performance evaluation engine 300, a social networking engine 400, and a database 500. The intelligent timeline application 20 may further include an advertisement placement engine 600. The processor 14 reads in the instructions stored in different engines of the intelligent timeline application 20 and executes the instructions, as will be described in further detail.

Database 500 gathers information from third party data sources 510 and stores the information in the form of events. An event may be a public announcement, market data, economic indicator, economic forecast, weather, political incident, or any other newsworthy information that has the potential to affect market values such as stock prices. Alternatively, an event may be a market action, such as a buying or selling transaction of an owner of a timeline. In a non-limiting embodiment, an event may also be manually created. Gathering of information by database 500 may be done on a real time basis or database 500 may be updated periodically. In one or more embodiments, database 500 may be located in hosting system 38 shown in FIG. 1. Third party data sources 510 may be located outside of the hosting system 38 and electronically connected to the database 500 via network 30. Alternatively, database 500 may be located in memory 22 (shown in FIG. 1) and third party data sources 510 may be electronically connected to memory 22 via network 30. Alternatively, database 500 may be located within hosting system 38.

Each event includes a timestamp. The timestamp is a point in time which may be the date of a meeting, the date of publication, the date of market survey, a future date of economic forecast, and so on that is representative of the relevant time of the event. In a non-limiting embodiment, an event may also have one or more tags. The tags are keywords that are relevant to the topics contained in an event. Examples of tags include "oil," "pipeline," "Delta Airlines," "energy," "OPEC," "Saudi Arabia," and so on. The tags may be searchable by the timeline engine 100. Alternatively, an event may contain text data that is generally searchable with one or more keywords by the timeline engine 100. The events may include attachments and/or links to internal or external websites as reference.

Timeline engine 100 selects a subset of events from the database 500 according to one or more filters 110 and generates a timeline 120, which is a subset of events sorted according to their timestamps. A filter 110 may use one or more tags to search and select the subset of events. Alternatively, a filter 110 may use a set of keywords to search and select the subset of events. In a non-limiting embodiment, two or more filters 110 may be used to create one timeline 120. Additionally, the timeline engine 100 may send the timeline to a web engine 40. As described above, the web engine 40 may be part of the intelligent timeline application 20, or alternatively, the web engine 40 may be separate from intelligent timeline application 20. The web engine 40 may create one or more timeline pages 710 that displays the timelines 120 on the web browsers 36 of user devices 34 (shown in FIG. 1).

Calendar engine 200 may be an electronic calendar and may include a scheduler. A scheduler may include meeting or call appointments, to-do lists, and other reminders with specific timestamps. The events created by the timeline engine 100 may be shared with the calendar engine 200, where the calendar engine 200 may import events created by the timeline engine 100, or the timeline engine 100 may import events created by the calendar engine 200. The events may be displayed by the web engine 40 on a calendar page 720. The calendar page 720 may show one or more events per day, a few days, week, month or any other desired period on the web browsers 36 of user devices 34. In one or more embodiments, the calendar page 720 may show one or more timelines that include timestamps falling within a specific time period in a calendar form. The calendar engine 200 may be able to send alerts or notifications to a group of people related to an event via email, message, or any other electronic means of communication. As with events, the alerts or notifications may include attachments and/or links to internal or external websites as reference. The events may be edited on the timeline pages 710 or calendar page 720.

It is to be noted that the events may be conditionally entered such that an event may be automatically entered if one or more certain internal and/or external conditions are met. For example, an alert or notification may be entered into a timeline 120 of an owner if another event such as a market indicator reaches a certain value within a given time period. An owner of a timeline 120 may set up a condition manually, or the timeline engine 100 may be programmed to automatically generate an alert or notification.

Performance evaluation engine 300 analyzes one or more actions (events) of an owner of a timeline 120. In one or more embodiments, the performance evaluation engine 300 compares a value in different times. For example, the value to be compared is a market price of a stock, and the value at the time of a first action of an owner is compared with the value at her second action after a certain time interval. In one or more embodiments, a forecast value at the time of the first action may also be used as a reference for comparison. Such a forecast value may be collected from third party data sources 510 and stored as an event in the database 500 or it may be entered by the owner of the first action. In this situation, the value at the second action is compared with the forecast value, and the discrepancy is used for performance evaluation of the owner's actions. In other embodiments, a target value may be used as a reference for comparison. The performance evaluation may check whether the target value is reached within or after a certain time interval from the first action.

In other embodiments, theoretical concepts from finance or performance management or other subjects may be applied to all the events on the timeline 120 such that the performance evaluation engine 300 recognizes the fulfilment of those theoretical conditions and deliver an associated output. For example, the performance evaluation engine 300 may be programmed to consider all the previous events in the database 500 and recognize the best practice response for trading stocks under specific conditions according to a specific financial theory. If all these conditions are achieved, the performance evaluation engine 300 may highlight the stock and send a notification to the owner and "subscribers" of a timeline 120 or social networking channel such as social networking channel 410 (described in detail below). If the owner's action in the timeline 120 does not match the best course of action recognized by the performance evaluation engine 300, the performance evaluation engine 300 may send a notification and/or a performance evaluation result to the owner and/or other relevant parties.

In still other embodiments, a third party's performance evaluation may be entered in the database 500 for comparison. As non-limiting examples, the performance evaluation results may be a score represented by a single number based on the comparison above, or they may be a rate of discrepancy between an owner's predicted value and actual value at the time of the second action. Alternatively, the performance evaluation results may be in the form of raw data showing all the events used in the comparison. The performance evaluation results may be displayed on the web engine 40 on a separate performance evaluation page 730. Alternatively, the performance evaluation results may be incorporated into the timeline page 710, calendar page 720, and/or social networking pages 740. The performance evaluation page 730 and other pages generated by the web engine 40 may be connected to one another by hyperlink buttons.

Social networking engine 400 includes one or more social networking channels 410. Each social networking channel 410 is owned by a channel owner, and subscribers may subscribe to the social networking channel 410. The channel owner may own one or more timelines 120, and the social networking engine 400 allows the channel owner of the timeline 120 to share her timeline 120 to one or more subscribers. The actions by the channel owner and other events on the timeline 120 may be shared to the subscribers in real time or in retrospect over the Internet or any other means of electronic communication such as via network 30. In one or more embodiments, performance evaluation engine 300 provides the performance evaluation results of the channel owner on at least one of her timelines 120 through the social networking engine 400. In other embodiments, theoretical concepts that were employed to cause the performance evaluation engine 300 to generate performance evaluation results may also be shared to the subscribers in real time or in retrospect, such that the events, especially actions, knowledge, and/or performance evaluation results of the owner, may be synchronously shared to the subscribers.

Social networking engine 400 also provides a commenting function where the subscribers may comment on the actions of the channel owner and the subscribers may also have access to the performance evaluation results. The information provided by the social networking engine 400 may be displayed on the web engine 40 on separate social networking pages 740, to which subscribers have access. Alternatively, the information may be incorporated into a section of the timeline pages 710 and/or performance evaluation page 730. The social networking pages 740 and other pages generated by the web engine 40 may be connected to one another by hyperlink buttons.

Timelines 120 may be put on sale on the social networking pages 740 such that subscribers may search and/or browse owners of timelines 120 and purchase or subscribe to a specific timeline 120. Timelines 120 may also be put on sale on different online marketplaces or platforms. The price for subscribing to a timeline 120 may be fixed. Alternatively, timeline 120 of a specific owner may be auctioned off to one or more highest bidding subscribers. Alternatively, timelines 120 may be provided free of charge. An owner of a timeline 120 may gift her timeline 120 to specific persons using an email link or access code to the timeline 120. Alternatively, a timeline 120 may be available by the channel owner of a social networking channel 410 free of charge. Timeline engine 100 may impose different access levels to timelines 120, such as owner having full access and ownership, contributing users having read and write access, subscribers having only read access, and so on. Different prices may be attached to different access levels.

In one or more embodiments, advertisements may be attached to specific timelines 120. Advertisement placement engine 600 manages the transactions of timeline sales and/or the placement of advertisements on timeline pages 710, calendar page 720, performance evaluation pages 730, and/or social networking pages 740. A timeline owner may place advertisements on her channels and/or allow third parties to place advertisements. Social networking engine 400 may generate sales rankings of timelines 120, performance evaluation rankings, and/or popularity rankings of social networking channels 410 to be displayed on social networking pages 740 to help subscribers with browsing and transactions.

Figure 3:
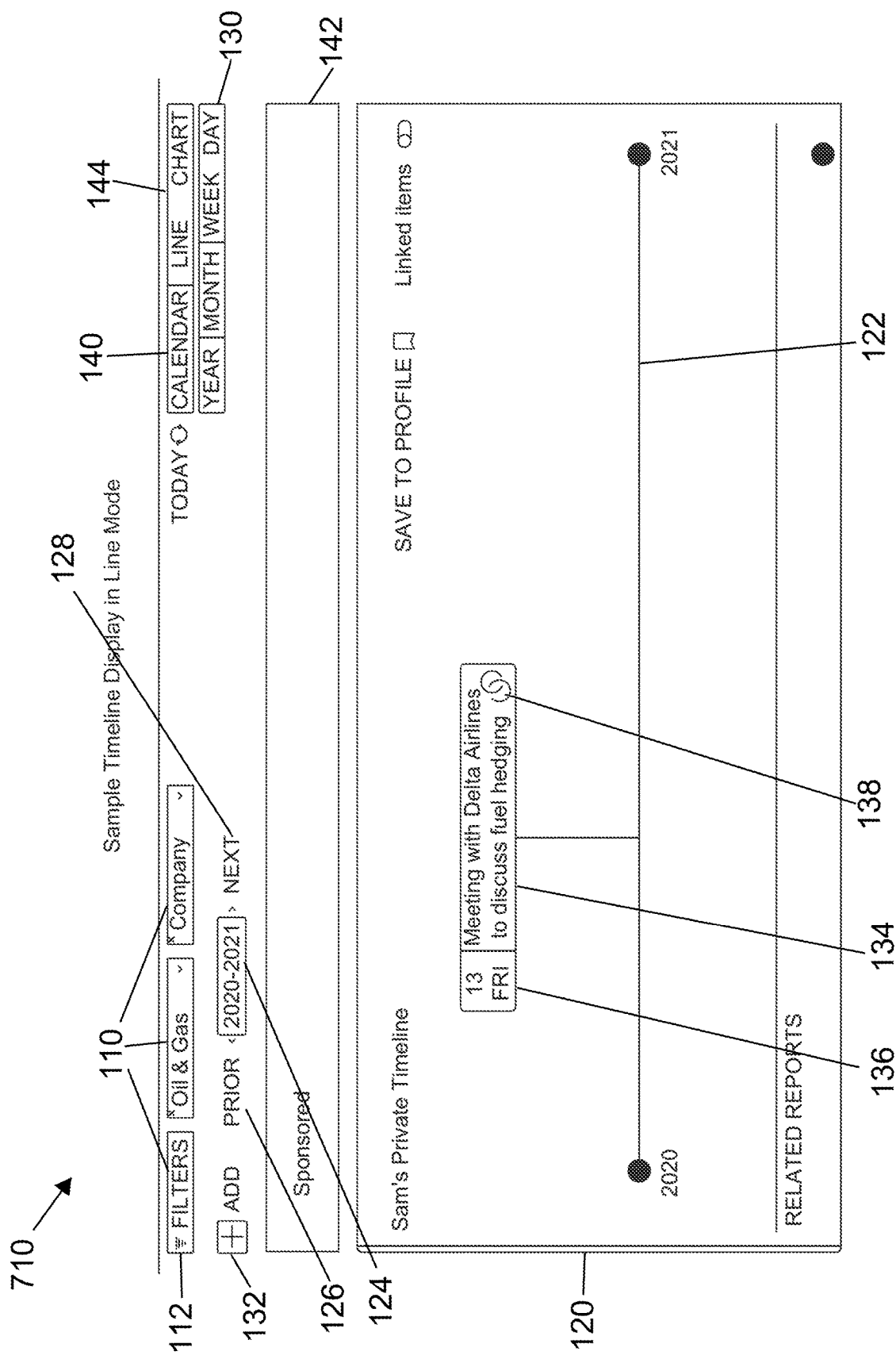
FIG. 3 is an exemplary timeline display.

Referring to FIG. 3, an exemplary timeline page 710 in the form of a graphical user interface (GUI) is shown. In this example, a timeline 120 selected using two filters 110 are displayed. The filtering is done by clicking on a filter icon 112 and selecting one or more desired filters or categories on a dialog box (not shown) that either pops up or is otherwise displayed over the timeline page 710. The selected filters, for example "oil & gas" and "company" are displayed. Each filter may have one or more additional subfilters, which may be further selected. For example, an "industry" filter may include "energy" and "information technology" subfilters, and a "user" filter may include "work" and "family" categories.

Timeline 120 may be private, partially public, or public. If a timeline 120 is private, only the owner of the timeline 120 can see the timeline 120. If it is partially public, the owner of the timeline 120 can allow access only to a selected group of subscribers. If it is public, everyone can see the timeline 120.

Timeline 120 includes a single event line 122, along which multiple events belonging to the timeline 120 are connected graphically by lines to the event line 122 according to their timestamps. By default, the time period 124 that the timeline page 710 displays is set to contain all the timestamps of events belonging to the timeline 120 in one screen. The timeline page 710 automatically adjusts the scale of the event line 122 in a way well known to a person of ordinary skill in the art. The time period 124 may be further adjusted manually by clicking the time period 124 button and entering the desired period to view on timeline pages 710. In one or more embodiments as in this example, the time period may be scrolled left (backward) and right (forward) by clicking the prior button 126 and next button 128. Alternatively, the time period 124 may be set to show one year, one month, one week, or one day by selecting an appropriate time view button 130. In other embodiments, a horizontal scroll bar or navigation slide (not shown) may be provided for users to view the event line 122 backward and forward in time.

In this example, only one timeline 120 is displayed. However, multiple timelines 120 may be displayed by clicking an add button 132, where multiple timelines 120 are appropriately arranged in one timeline page 710 in a way well known to a person having ordinary skill in the art. In some embodiments, multiple event lines 122 may be displayed side by side along the same time period 124 to help users visualize different events belonging to multiple timelines 120 around the same time. Each event object 134 is shown with a brief description of its content. The event object 134 may further show its timestamp 136 and/or a link to attachments 138.

Timelines 120 and event objects 134 may be updated in real time. Alternatively, they may be manually updated by the owner of the timeline 120. Timeline pages 710 may have a switch button (not shown) that toggles between a real-time update and a manual update.

Timeline pages 710 may also include links to other displays such as calendar page 720, performance evaluation pages 730, and social networking pages 740. In FIG. 3, a calendar link button 140 takes the user to calendar page 720. Timeline pages 710 may also comprise an advertisement section 142 which may be filled by advertisement placement engine 600.

In some embodiments, timeline pages 710 may have more than one mode of display. The timeline page 710 as shown in FIG. 3 is a line mode timeline display. For timelines that select a specific type of events such as a series of a single market value, for example share price fluctuation over time of a single stock, a chart mode timeline display (not shown) may be effective. Timeline display mode button 144 enables the user to choose between different modes of timeline pages 710.

Figure 4:
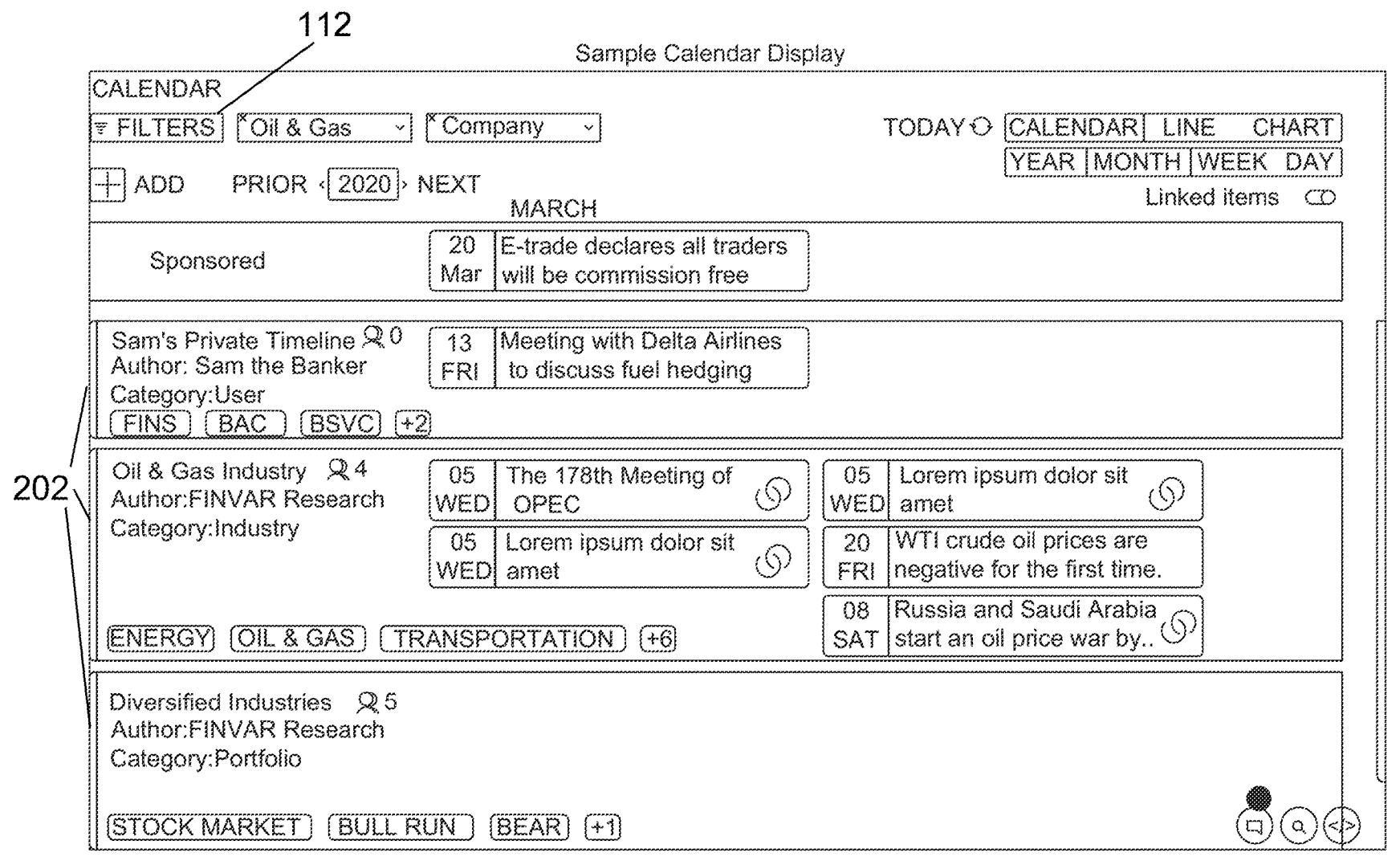

Referring to FIG. 4, an exemplary calendar page 720 in the form of a graphical user interface (GUI) is shown. Similarly to the timeline page 710 exemplified in FIG. 3, filtering is done by clicking on a filter icon 112 and selecting one or more desired filters or categories on a dialog box (not shown) that either pops up or is otherwise displayed over the calendar page 720. The selected filters, for example "oil & gas" and "company" are displayed. The time period 124 that the calendar page 720 displays may be controlled in the same way as in FIG. 3.

In one or more embodiments as shown in FIG. 4, calendar page 720 may include separate category boxes 202, where each of the category boxes 202 displays all the events belonging to the selected filter or category in one box. The category boxes 202 may be stacked vertically as shown in FIG. 4, or they may be stacked horizontally, tiled, or arranged in any other suitable format suitable for displaying multiple category boxes 202 on a screen. Event objects 134 having timestamps within the selected time period 124 are displayed in category boxes 202. Alternatively, in other embodiments, calendar page 720 may include a calendar (not shown) containing compartments for dates, weeks, months, and so on in an ordinary calendar format, where each compartment displays all the events having timestamps belonging to the selected filters or categories within the date, week, month, and so on. For example, a yearly calendar containing twelve compartments for twelve months may display all the events having timestamps falling in January of that year in a January compartment, and so on. As in timeline pages 710 shown in FIG. 3, calendar page 720 may also include links to other pages generated by the web engine 40 such as timeline pages 710, performance evaluation pages 730, and social networking pages 740.

Figure 5:
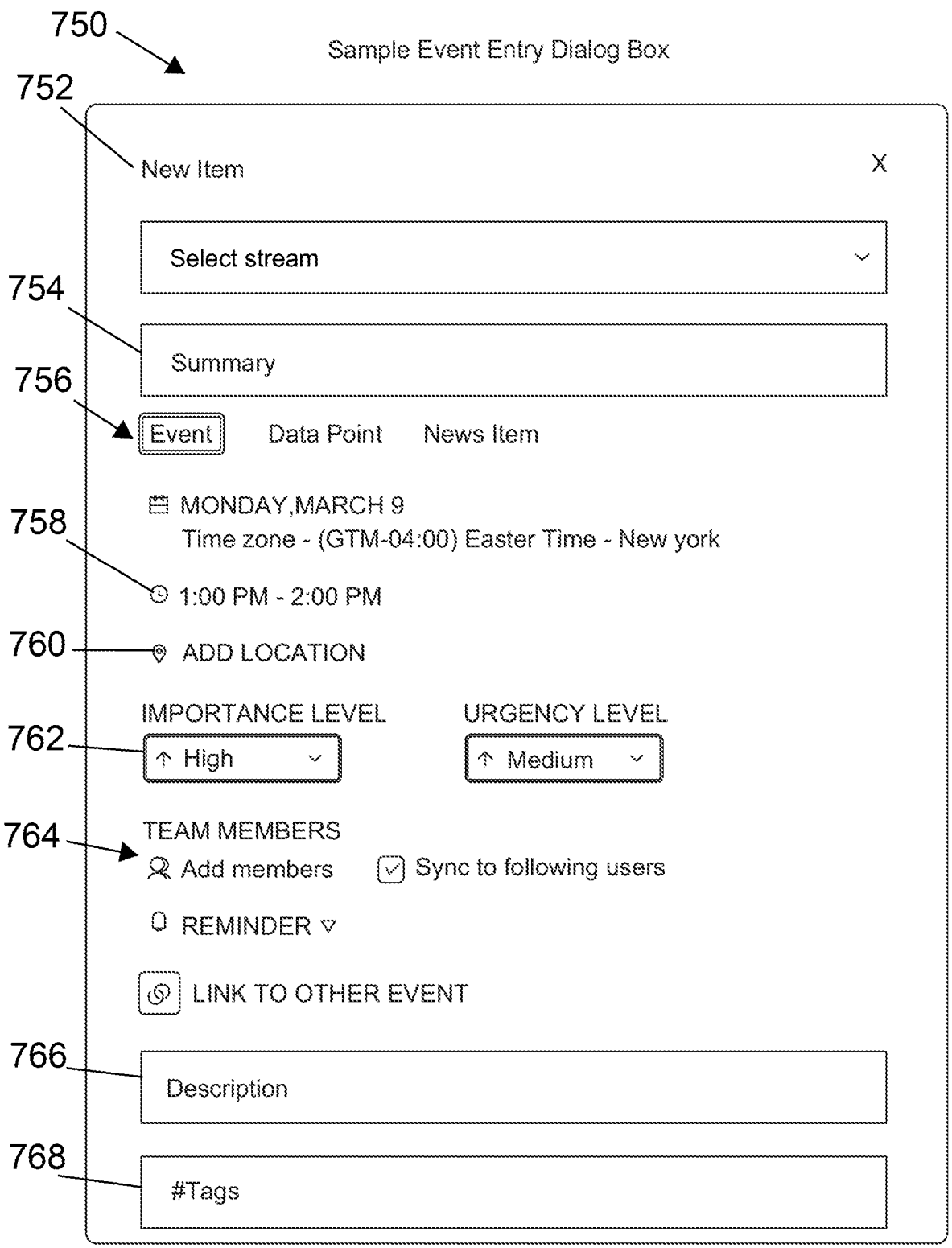
FIG. 5 is an exemplary event entry dialog box.

Referring to FIG. 5, an exemplary event entry dialog box 750 in the form of a graphical user interface (GUI) is shown by which an owner may create an event. Event entry dialog box 750 may contain ordinary items for creating a calendar event, such as title 752, summary 754, event type 756, timestamp 758, event location link 760, importance level 762, member list 764, tags 766, description 768, and so on. Texts in title 752, summary 754, tags 766, description 768 and so on may be searchable by timeline engine 100 and calendar engine 200 to be used for filtering events by category.

While certain exemplary embodiments have been described and shown in the accompanying drawings, it is to be understood that such embodiments are merely illustrative of and not restrictive on the broad application, and that this application is not limited to the specific constructions and arrangements shown and described, because various other modifications within the spirit of the present invention may occur to those of ordinary skill in the art.

What is claimed is:

1. A computer implemented system for an intelligent timeline and commercialization thereof with social networking features, the computer implemented system comprising:
   one or more memory comprising a program memory and a database, wherein the program memory includes processor readable instructions stored therein; and
   one or more processors configured to read and execute the processor readable instructions to cause the computer implemented system to:
   receive a plurality of events, wherein each event of the plurality of events comprises a timestamp and a searchable tag;
   store the plurality of events in the database;
   provide one or more timelines, wherein each timeline of the one or more timelines selects one or more timeline events from the plurality of events determined by the searchable tag, and each of the one or more timeline events comprises at least a first timeline event and a second timeline event;

provide for each timeline of the one or more timelines a performance evaluation result based on the first timeline event and the second timeline event;

provide a social networking channel comprising a subscription account having a subscription level, wherein the social networking channel receives at least one timeline of the one or more timelines and the performance evaluation result thereof, the subscription account is connectable to the one or more timelines and the performance evaluations thereof, and the subscription level determines the connection of the subscription account to the one or more timelines and the performance evaluations thereof; and generate one or more webpages, wherein each of the one or more webpages includes the one or more timelines, the performance evaluation result, or the social networking channel.

2. The computer implemented system of claim 1, wherein the one or more processors is further configured to cause the computer implemented system to receive a payment and adjust the subscription level.

3. The computer implemented system of claim 2, wherein the one or more timelines are purchasable.

4. The computer implemented system of claim 3, wherein the one or more processors is further configured to cause the computer implemented system to: adjust the subscription level according to the one or more timelines purchased through the payment.

5. The computer implemented system of claim 2, wherein the one or more processors is further configured to cause the computer implemented system to place an advertisement on the social networking channel.

6. The computer implemented system of claim 1, wherein at least one timeline of the one or more timelines comprises a timeline hyperlink.

7. The computer implemented system of claim 6, wherein the timeline hyperlink is sharable.

8. The computer implemented system of claim 1, wherein the performance evaluation result is further based on comparing between the first timeline event and the second timeline event.

9. The computer implemented system of claim 1, wherein the performance evaluation result is further based on one or more theoretical financial models stored in the one or more memory and applied to the one or more timeline events.

10. The computer implemented system of claim 1, wherein the social networking channel synchronously receives the at least one timeline of the one or more timelines and the performance evaluation result thereof.

11. The computer implemented system of claim 1, wherein the subscription level is an owner, a contributing user, or a read only user.

12. The computer implemented system of claim 1, wherein the social networking channel further comprises a timeline sales ranking, a timeline performance evaluation ranking, and a social networking channel popularity ranking.

13. The computer implemented system of claim 1, wherein the social networking channel further comprises a comments section.

14. The computer implemented system of claim 1, wherein at least one webpage of the one or more webpages includes a calendar page including the one or more timelines.

15. The computer implemented system of claim 1, wherein the one or more processors is further configured to cause the computer implemented system to receive the plurality of events in real time.

16. The computer implemented system of claim 1, wherein the one or more processors is further configured to cause the computer implemented system to receive the plurality of events periodically.

17. The computer implemented system of claim 1, wherein the one or more processors is further configured to cause the computer implemented system to update the one or more timelines in real time.

18. The computer implemented system of claim 1, wherein the one or more processors is further configured to cause the computer implemented system to receive the plurality of events from a user.

19. The computer implemented system of claim 1, wherein the database is on a cloud server.

20. The computer implemented system of claim 1, wherein the one or more processor is further configured to cause the computer implemented system to receive the plurality of events from one or more third party data sources.

* * * * *